United States Patent
Martines et al.

(10) Patent No.: US 8,579,110 B2
(45) Date of Patent: Nov. 12, 2013

(54) LIQUID-TIGHT CONTAINER FOR STORING AND TRANSPORTING AFM PROBES

(75) Inventors: Elena Martines, San Sebastian (ES); Isabel Garcia Martin, San Sebastian (ES); Soledad Penades Ullate, San Sebastian (ES)

(73) Assignee: Centro de Investigacion Cooperativa en Biomateriales (CIC Biomagune), San Sebastian (ES)

( * ) Notice: Subject to any disclaimer, the term of this patent is extended or adjusted under 35 U.S.C. 154(b) by 176 days.

(21) Appl. No.: 13/262,482

(22) PCT Filed: Mar. 29, 2010

(86) PCT No.: PCT/EP2010/054054
§ 371 (c)(1),
(2), (4) Date: Nov. 14, 2011

(87) PCT Pub. No.: WO2010/112438
PCT Pub. Date: Oct. 7, 2010

(65) Prior Publication Data
US 2012/0055842 A1    Mar. 8, 2012

(30) Foreign Application Priority Data

Mar. 31, 2009    (EP) ..................................... 09382041

(51) Int. Cl.
*B65D 85/38*    (2006.01)
(52) U.S. Cl.
USPC ............................................ 206/305; 53/489
(58) Field of Classification Search
USPC ............ 53/473, 476, 484, 489; 206/205, 207, 206/305, 701, 722, 723, 816; 220/213, 220/309.1
See application file for complete search history.

(56) References Cited

U.S. PATENT DOCUMENTS

| | | | |
|---|---|---|---|
| 5,705,814 A | 1/1998 | Young et al. | |
| 6,068,119 A * | 5/2000 | Derr et al. | 206/305 |
| 6,341,688 B1 * | 1/2002 | Graham | 206/63.5 |
| 7,191,901 B2 * | 3/2007 | Maxim et al. | 206/456 |
| 7,469,788 B2 * | 12/2008 | Chiu et al. | 206/710 |
| 7,628,068 B2 * | 12/2009 | Bessette | 73/431 |
| 2004/0079673 A1 | 4/2004 | Nakayama et al. | |
| 2008/0006083 A1 | 1/2008 | Feinstein et al. | |
| 2008/0179206 A1 | 7/2008 | Feinstein et al. | |

FOREIGN PATENT DOCUMENTS

| | | |
|---|---|---|
| WO | 97 08733 | 3/1997 |
| WO | 2008 002922 | 1/2008 |

OTHER PUBLICATIONS

International Search Report Issued May 19, 2010 in PCT/EP10/054054 filed Mar. 29, 2010.

* cited by examiner

*Primary Examiner* — Jacob K Ackun
(74) *Attorney, Agent, or Firm* — Oblon, Spivak, McClelland, Maier & Neustadt, L.L.P.

(57) ABSTRACT

The present invention provides a container and a method that can be used to transport and store AFM probes in a liquid buffer. This container fastens an AFM probe and consists of a plastic lid that secures a probe while keeping it in a controlled environment, thus preventing that the tips are contaminated by air-borne molecules, packaging material, deposited substances or air bubbles. In the case of functionalized probes, the surface molecules are still functional upon arrival. The tips cannot be broken upon transport because they are held by the container, however the probes can be easily removed upon opening of the container.

14 Claims, 4 Drawing Sheets

LIQUID-TIGHT CONTAINER FOR STORING AND TRANSPORTING AFM PROBES

TECHNICAL FIELD

The present invention refers to a liquid-tight container that permits safe, clean and reliable storage and transportation of Atomic Force Microscopy (AFM) probes, and more particularly to a low-friction, low-outgassing device that allows secure holding of chemically-modified AFM probes, thereby preserving their functionality.

STATE OF THE ART

Atomic Force Microscopy (AFM) is the most widely used technique from the family of Scanning Probe Microscopy, and it has become a powerful tool for studying and imaging biological samples at the nanoscale. AFM is based on the detection of the action of a local force between the surface atoms of a sample and the atoms of a tip, the latter being attached to a force sensor.

In order to measure biomolecular interactions by AFM force measurements, the most commonly used force sensor is a micro-cantilever fabricated from a wafer of silicon or silicon nitride. Thus, the cantilevers protrude from a silicon (nitride) chip. The tip is fabricated or attached onto the force sensor (the cantilever) that allows the detection of the force. In order to probe only local interactions, this tip is very sharp, as it usually has apex radius dimensions less than a micrometre, or even a few tens of nanometres. Herein, the term probe comprises the chip, at least one cantilever and its respective tip. The most common detection technique measures a change in cantilever deflection due to a force exerted at the end of the cantilever, by using a focused laser beam that is reflected at the free end of the cantilever, above the tip. The cantilever deflection is usually detected by a precise displacement detector, such as an interferometer or a photodiode.

Because of their resolution and versatility, AFMs are important measurement devices in many diverse fields ranging from semiconductor manufacturing to biological research. Unbinding forces are detected as rupture events which are sensed by the cantilever deflection, yielding a map of recognition sites that may be combined with further acquired information such as simultaneous monitoring of sample topography. Also, specific unbinding forces yield information about the association and dissociation kinetics of ligand-receptor interactions, protein unfolding patterns, etc. The oscillation and bending of the cantilever in the elastic regime allows measurements of force gradients or forces ranging from a few tens of pN up to tens of nN. The required elastic properties of the cantilevers depend on the specific application.

An AFM can be used as a single-molecule biosensor by coupling a ligand molecule to the tip, which is moved over the sample surface and recognized by complementary receptor molecules on the sample surface. By measuring unbinding forces between receptor-ligand pairs, the AFM not only allows to measure specific interactions between single molecules, but it also allows these interactions to be measured in physiological conditions. For instance, the kinetics of receptor-ligand interactions can nowadays be measured directly on live mammalian cells. The required chemically-modified (or functionalised) AFM probes—now comprising the chip, the cantilever and the functionalised tip—are obtained by tethering specific molecules to the tip, which are used in receptor-ligand experiments for the measurement and mapping of specific interactions. Such specific interactions are involved in many important biological processes, and their selectivity and specificity are widely exploited in nanobiotechnology for developing bioanalytical and biomedical devices such as biosensors. Accordingly, for ensuring that functionalised probes yield reliable biosensing AFM measurements, it is necessary that these probes are free of contaminants at the tip apex.

Avoiding contamination at any position near the tip apex is critical for some applications that demand the highest resolution available from an AFM, which may refer to in-plane (xy) resolution, which is important when the topography of a sample surface is studied, or vertical (z) resolution, which is important when any derived magnitude of the interaction such as the force, the force gradient, the local stiffness or the like is studied.

Contamination is particularly common in non-controlled environments, other than clean rooms or the like. Even though silicon probes can be chemically cleaned by dipping into a Piranha solution ($H_2SO_4/H_2O_2$ 7:3), or physically cleaned by etching them in $O_2$ plasma, it is important to notice that these standard techniques cannot be used to remove contamination from the tip of a functionalised AFM probe, because these cleaning techniques would also destroy the functional molecules. Also, ultrasonic cleaning must be generally avoided on AFM probes because it can physically damage the tip, as it is known that nanofabricated features (such as AFM tips) can be totally destroyed by sonication. Moreover, sonication could lead to degradation processes of the biomolecules, such as the denaturation of proteins. Therefore, it must be emphasised that it is necessary to find a way to keep the functionalised probes clean during all the steps from functionalisation to the experiment, preventing their exposure to contaminants.

Current storage and transport containers for commercial AFM probes are based on the common clamp-shell shipping and packaging materials, such as the Gel-Pak® (a registered trademark of Gel-Pak LLC Ltd of Sunnyvale, Calif.), which have been shown to outgas low-molecular-weight siloxanes which contaminate the cantilevers (Y. Lo, N. D. Huefner, W. S. Chan et al., Langmuir 15, 6522 (1999)). Moreover, the tips in the Gel-Pak® are exposed to air-borne contaminants which end up covering the probes. Therefore the Gel-Pak® technology is not suitable for transporting and storing functionalised probes, which cannot be cleaned.

One way to prevent contamination of the probes by air-borne molecules is to store the probes in a liquid buffer solution. Moreover, a liquid environment is critical to preserve the functionality of biomolecules such as proteins or the like. However previous art containers, like the one by the firm Nanocraft GmbH, have no system to avoid bubble trapping in the container. Actually, in liquid environment not only contaminants, but also gas bubbles (for example air bubbles) are undesirable because they can dry or denaturate sensitive biomolecules (such as proteins) when passing over a functionalised surface. It is therefore necessary to provide packaging solutions for storing functionalised AFM tips in liquid buffer, while ensuring that no gas bubbles stay trapped in the container.

In addition, when functionalised AFM probes are stored in liquid with the tips pointing upwards (a so-called face-up position), the tips are exposed to chemical species which may deposit on them due to processes such as sedimentation or the like. If present in the buffer, contaminants would sediment both on the functional side of the cantilevers and on the base of the container during the storage time.

Yet another source of tip contamination can be the silicon or metal debris caused by wear of the silicon chip. Chip scratching and wear can be caused by the user when manipulating the probes with tweezers, and it is particularly common when the container makes it difficult to remove or grab the probes. Moreover, given that AFM cantilevers are very fragile because of their reduced dimensions, if probe removal from the container is not a straightforward operation, it is easy to break the cantilevers when removing the probes from the vendor's package in order to mount them in the AFM. Although adhesive means such as the Gel-Pak® technology prevent any scratching of the probe chips, adhesives must be avoided to immobilize functionalised AFM probes, in order to prevent contamination from outgassed materials. On the other hand, previous art containers like the one by the firm Nanocraft GmbH use a structure that clips the chip against a support and therefore substantially puts in contact at least one surface of the probe with a wall of the container, thus risking to break the cantilevers protruding from that side. In such a container, the risk of breaking the cantilevers by accidental collision of the tweezers is even increased with respect to adhesive-based containers because the probe is packaged in a liquid environment, where undesired slip events are more likely to occur. Therefore previous art containers fail to ensure both a safe and clean solution for storing and removing AFM probes without risking to break or contaminate the cantilevers.

Actually, a variety of factors can lead to tip replacement during an experiment, such as non-expected contaminants between tip and samples, or atomic wear phenomena that degrade the sensor performance, due to friction and wear occurring at the nanoscale. As a consequence, even in controlled operation modes and environments, AFM probes are constantly exchanged. This occurrence is not negligible given that AFM is used in many experimental setups nowadays, and that AFM probes are expensive to buy and to functionalise. This situation calls for clean and safe containers for the storage, transportation and manipulation of non-contaminated and functionalised probes, where the cantilevers are not damaged by any of the above-mentioned procedures.

SUMMARY OF THE INVENTION

It is an object of the invention to provide a liquid-tight packaging solution for AFM probes, allowing storage and transport of AFM probes in a liquid environment. The invention allows to avoid contamination, namely the deposition of chemical species during probe storage and transport, and to avoid molecule denaturation on functionalised tips, combined with a reliable and easy way to remove the probes. This and other objects of the invention are achieved by the container defined by the independent claim 1. Further aspects of the invention and favourable embodiments are described by the dependent claims. A method for storing and transporting AFM probes is also disclosed in claim 14. Further, a carrying device for storing and transporting AFM probes is disclosed in claim 15.

In a first inventive aspect, the invention discloses a container that is fabricated from a flexible enough material. The container comprises two parts, the body and the lid, The body comprises a plurality of walls, wherein one of the walls constitutes the base or bottom wall of the container and the remaining constitute the lateral wails, and wherein the base has a probe receptacle providing a storage place for an AFM probe.

The lid is designed to close-fit the lateral walls when inserted in the body, thus providing a liquid-tight sealing of the container, and has at least one protrusion that is aligned with the centre of the probe receptacle attached to the base.

In order to store the AFM probe, this is placed in the probe receptacle, with the tips facing upwards. In a first position, the lid is pressed onto the probe in the receptacle and thus the container is closed and the probe fastened to withstand any tilting or jarring of the container. The lid is removed from the probe when the container is in a second open position, so that the probe is resting on the probe receptacle and is not retained by any part of the container. As a consequence, the probe is not fastened by any means during the removal although it was held while it was stored or transported. In this resting position, the tips are again facing upwards. When the lid and the body are in a closed first position the invention provides a liquid-tight container. This container ensures that at least one functionalised AFM probe is placed therein and immersed in a liquid.

The probe receptacle is made by two sets of portions (the retainers) that surround the probe. A first set of portions is in contact with the lateral side of the probe and has a minimum height H, which is substantially higher than the probe maximum thickness t, so to constrain the probe translation along its transversal direction. A second set of portions is in contact with the sides of the chip having a length W that may comprise the cantilevers and the tips. This second set of portions has a maximum height h, much lower than the thickness of the probe t, so that any contact with the protruding cantilevers is avoided. This second set of portions limits the translation of the probe along its longitudinal axis.

Most importantly, the spacing of the retainers ensures that the probe has limited (xy) mobility within the probe receptacle since these retainers constrain the probe motion. Particularly, the probe in-plane (xy) translation and rotation along the vertical (z) axis is prevented when the container is in the open first position or in the closed second position. This in turn makes sure that the protrusion of the lid, which is aligned with the centre of the probe receptacle, can only touch the probe chip, and never any of the cantilevers. The spacing of the retainers also limits the probe rotation in (z), which is essential to avoid that the cantilevers touch the first set of portions with height H. The remaining degrees of freedom of the probe movement, namely the rotation on the (x) and (y) axis and the (z) translation, are blocked by pressing the lid protrusion on the chip when the container is in a first closed position.

The contact between the probe and the protrusion of the lid is punctual, i.e. as small as a contact between a sphere and a plane (a point). However, in this context punctual may refer to contact areas approximately below 1 mm². As a consequence, adhesion and friction between the lid and the chip are reduced to a minimum. Moreover, the container is made of materials with a substantially small friction coefficient and a low adhesive behaviour, such as PTFE or PE. Thus, the container features a negligible adhesive behaviour between the portions of the probe in contact with the APO probe. This in turn ensures that the probe sits on the probe receptacle when the container is in au open second position, as the chip does not adhere to the lid.

The small contact area between the probe and the punctual protrusion of the lid is combined in this container with a liquid-tight sealing of the container at the upper portion. Even though, in order to ensure a liquid-tight sealing, a relatively high pressure is exerted on the small contact area between the probe and the lid, this container ensures a flexible-enough fastening of the probe because the stiffness of the lid protrusion and of the probe receptacle is lower than the stiffness of the probe, so that the container can accommodate the main pall of the deformation when it is in a closed first position. For example, flexible materials such as plastics are well-suited because the Young Modulus of such materials is much lower than silicon (150 GPa). Therefore, although liquid-tight pressure-sealing of the container implies higher forces on the small contact area between the probe and the lid, the container material ensures that the probe is not broken. Moreover, its elastic properties allow this protrusion to be used for the storage and transport of commercial probes of any thickness, which usually ranges from 0.3 to 0.5 mm.

Yet another important feature of the lid is its shape, which minimizes the formation of air bubbles in the solution while being closed. This feature is achieved by shaping at least one portion of the inner part of the lid as a convex or a substantially conical or spherical surface that prevents the presence of air bubbles by allowing air to progressively escape from the container while this is being closed. Thus, processes arising from the presence of bubbles that can denaturate some biomolecules and favour the adsorption of contaminants near the tip apex are prevented. Therefore this feature ensures that the cleanliness and functionality of chemically-modified AFM probes is preserved.

The probe receptacle presents a portion of it, the one in contact with the chip of the AFM probe, which is a substantially flat surface, free of any minute protuberance. This feature ensures that the pressure exerted by the protrusion of the lid while pressing the probe against this surface of the probe receptacle will not lead to any undesired stress on the chip, thus avoiding any possible fracture of the chip while it presses the probe. Importantly, this surface is spaced apart (lifted) from the inner bottom surface of the container where deposits can sediment when the container sits in an upright position, i.e. when it is oriented in such a way that the lid is located above the container body. Therefore, when the probe sits horizontally in its receptacle with the tips face-up, these are not surrounded by the contaminants or aggregates that may deposit on the bottom surface of the container. Nevertheless, the probe receptacle allows to store an AFM probe with the tips in a face-down position because the whole container can be turned in an upside-down position, i.e. with the container sitting on the lid. This face-down position is important during probe storage because chemical species may deposit and attached onto the functionalised tip by sedimentation or the like. Thus, the tip can be kept clean for longer times because the probe is kept substantially horizontal and the tips are in a face-down position. The container design therefore ensures that in both the face-up and face-down position the exposure of the tips to contaminants or aggregates is minimized.

The container is made of a chemically inert, low-outgassing material, thus ensuring that the reactions between the chemical species in the liquid and in the walls of the container are reduced to a minimum, and that no contaminants in general, such as particles or monomers, are released into the storing buffer from the container. The inhibition of such processes helps avoiding the presence of non-desired chemical species on the critical AFM probe zone, namely the tip apex. Furthermore, as the cleanliness and chemical inertness of the container is improved with respect to previous technology such as the adhesive-based Gel-Pak and the like, a wider range of storing liquids may be used, as opposed to containers made of more reactive and outgassing materials. Moreover, the use of plastic materials allows further treatments that could be convenient such as plasmas that allow switching from hydrophilic to hydrophobic materials. Finally, translucent, transparent or even reusable materials could be used.

In addition, not only AFM probes but test surfaces in general, which need to be kept clean, can be stored and transported using the disclosed container, for instance functionalised surfaces used as samples.

A method for storing and transporting AFM probes, wherein the AFM probe can be placed in a face-up or face-down position in the previously disclosed container, thereby minimizing the exposure of the tip to undesired chemical species, is also disclosed in a second inventive aspect.

In a third inventive aspect, the container described so far provides a liquid-tight container for dean transport and storage of at least an AFM probe. It can also be generalised so that a set of these containers are arranged in a carrying device or carrier for storage and transportation of multiple probes, where each container provides an individual compartment for a probe. This arrangement provides a carrier to individually store a plurality of probes, thereby avoiding cross-contamination, and allowing to simultaneously transporting several probes in different liquid buffers.

BRIEF DESCRIPTION OF THE DRAWINGS

The invention will be better understood and objects other than those set forth above will become apparent when consideration is given to the following detailed description thereof. Such description makes reference to the annexed drawings, wherein.

PREFERRED EMBODIMENT OF THE INVENTION

In one preferred embodiment of the invention, the container 30 has the shape of a cylindrical box, and it is fabricated from a low-friction, low-outgassing, non-contaminating plastic material, such as medical or even food grade material.

Figure 1:
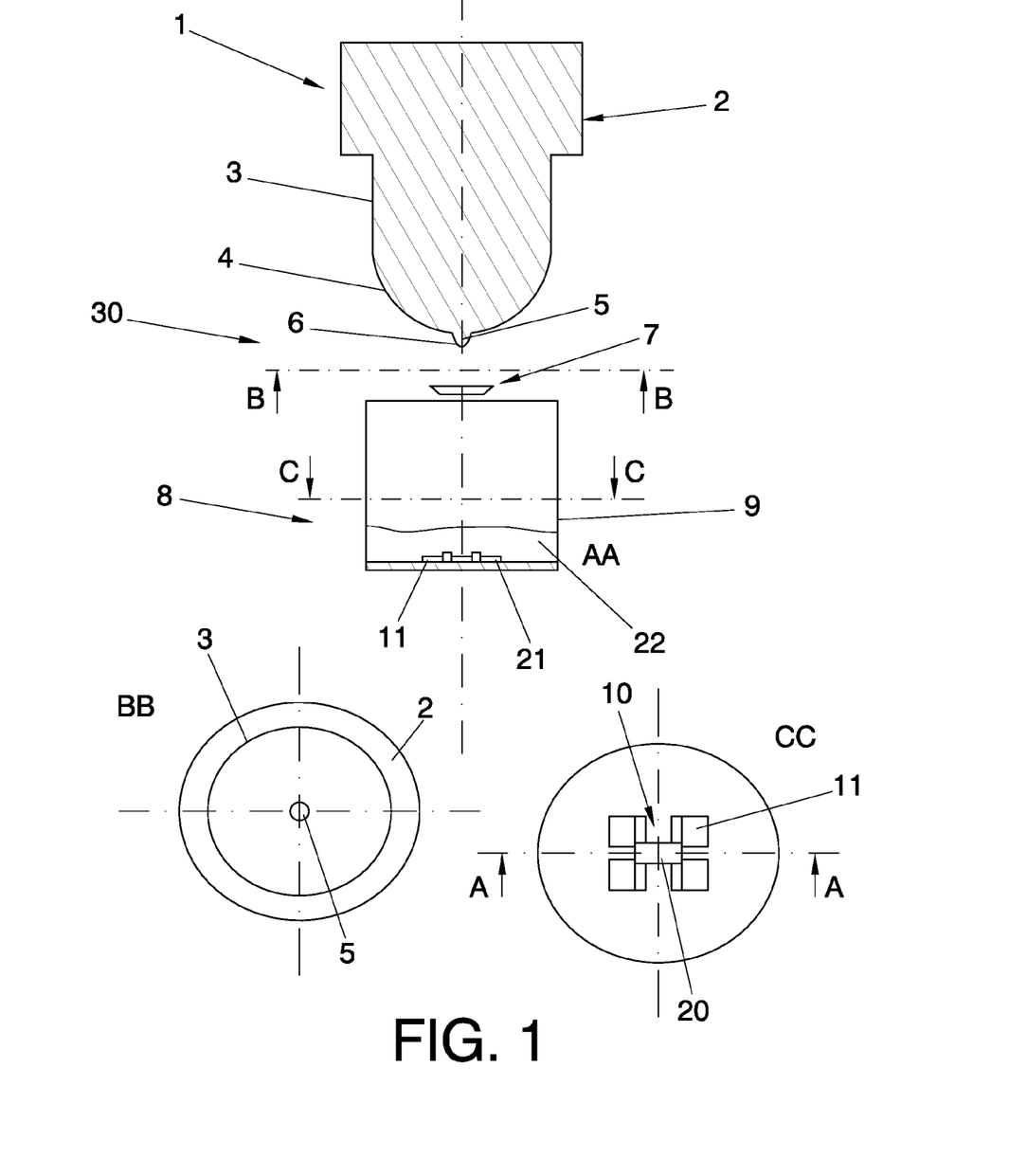
FIG. 1 shows a cross section view of a first embodiment of the invention.
Figure 4:
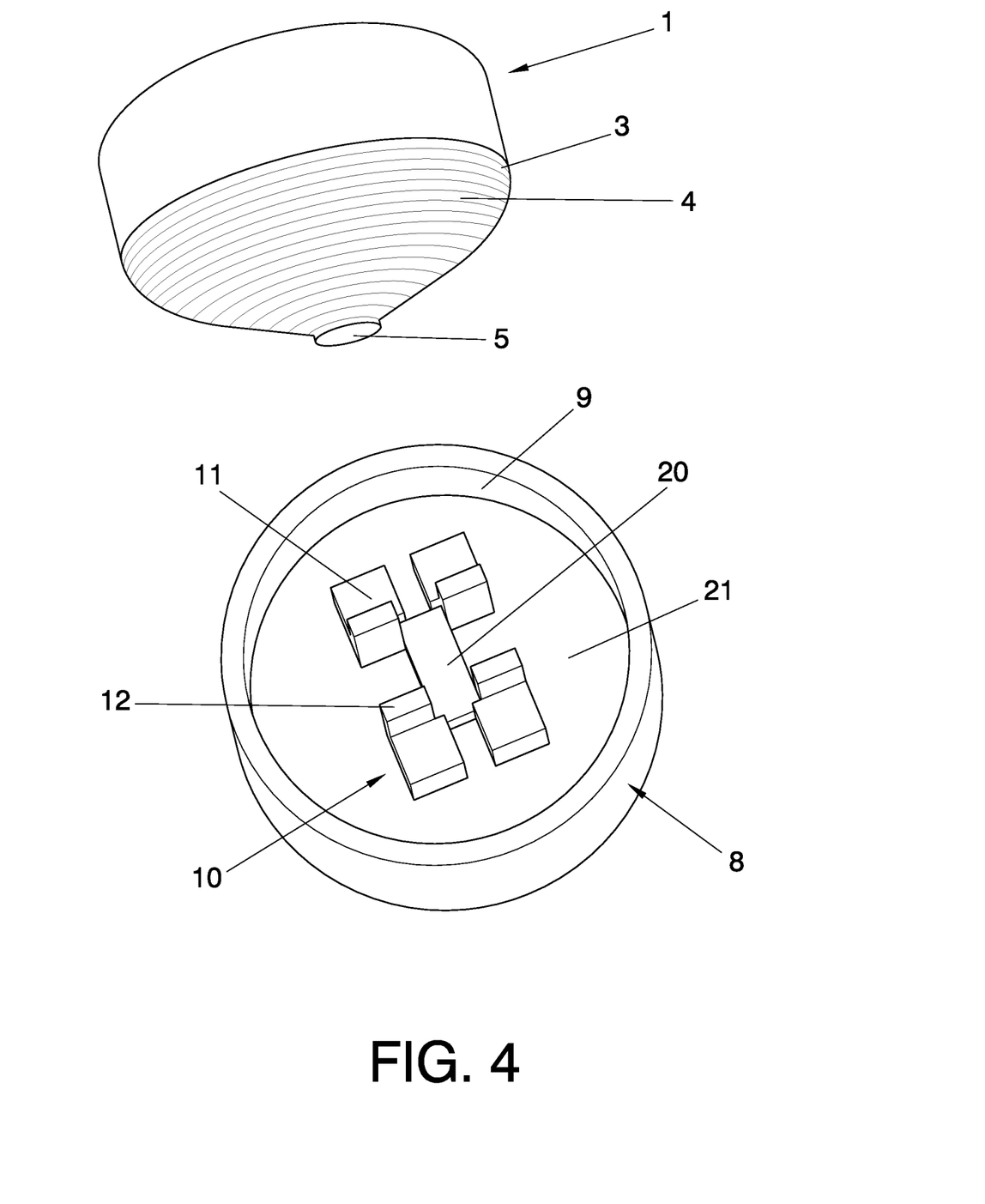
FIG. 4 shows an embodiment of the invention.

As depicted in FIG. 1 and FIG. 4, this container 30 comprises a lid 1 and a base 8. The lid 1 comprises an outer part 2 and an inner part. The surface of the inner part of the lid 1 comprises a protrusion 5, or first portion of this inner part, intended to hold the probe, a second portion 4, shaped to allow bubbles to escape, and a third portion 3 which ensures a liquid-tight sealing when the lid 1 is inserted in the base 8. When the container 30 is closed, the protrusion 5 holds down the probe 7 in its receptacle 10, thus preventing any tip damage or displacement by tilting, jarring or turning the container 30 upside-down.

In this preferred embodiment, the lid 1 can be inserted in the base 8, being the outer part 2 of the lid 1 big enough to be grabbed by hand. The lid 1 is fabricated from a flexible enough material. Materials such as high-density polyethylene or Teflon have a Young Modulus of 0.5-1.4 GPa, a much lower value than silicon (150 GPa). These materials are found to be unreactive at room temperatures except to species such as some strong oxidizing agents. The material can be translucent to allow visualisation of the contents without removing the container 30. The material can be cleaned using solvents or plasma to increase its hydrophilic property and for re-use of the container 30.

Figure 2:
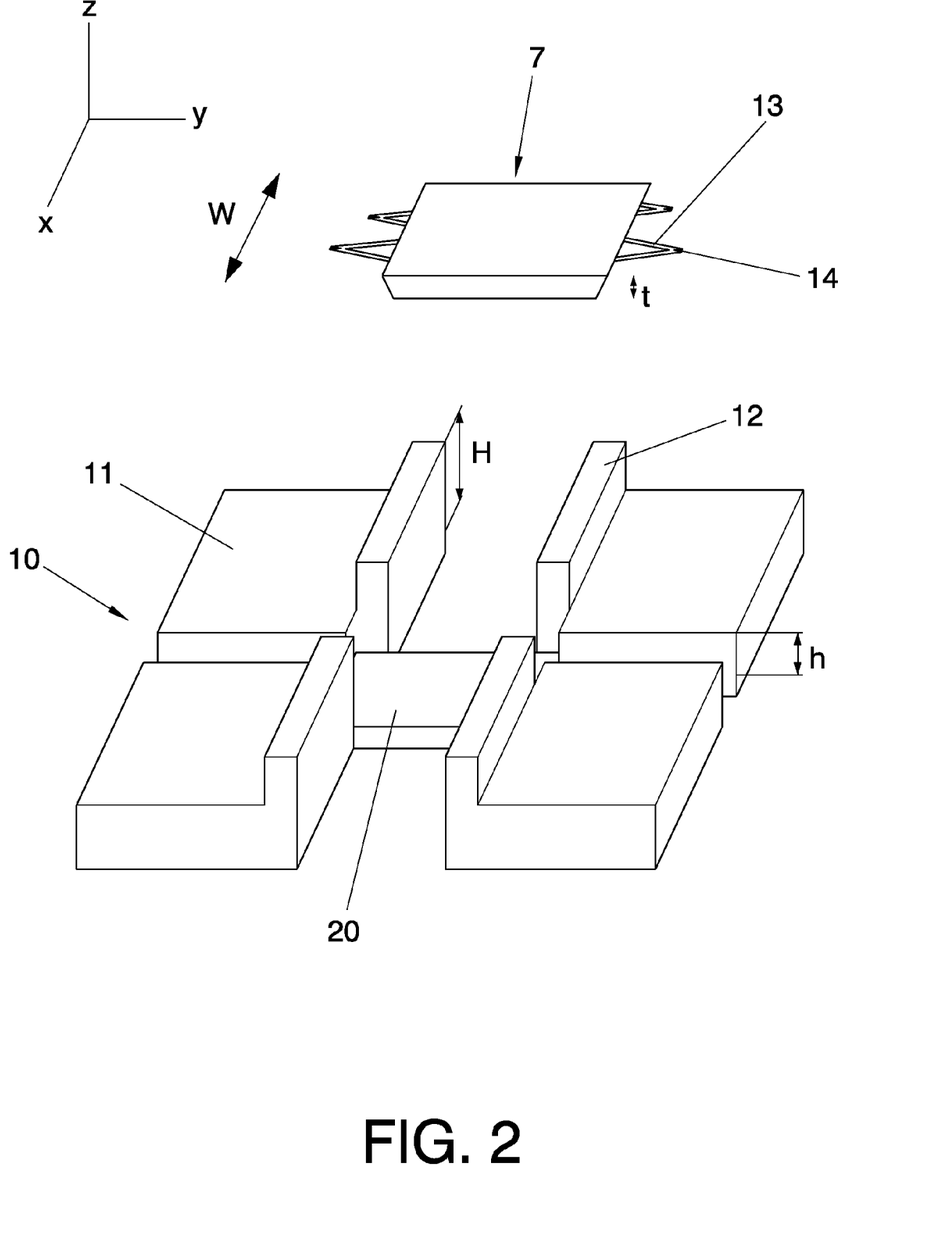
FIG. 2 shows a perspective view of a detailed part of the first embodiment of the invention.
Figure 3:
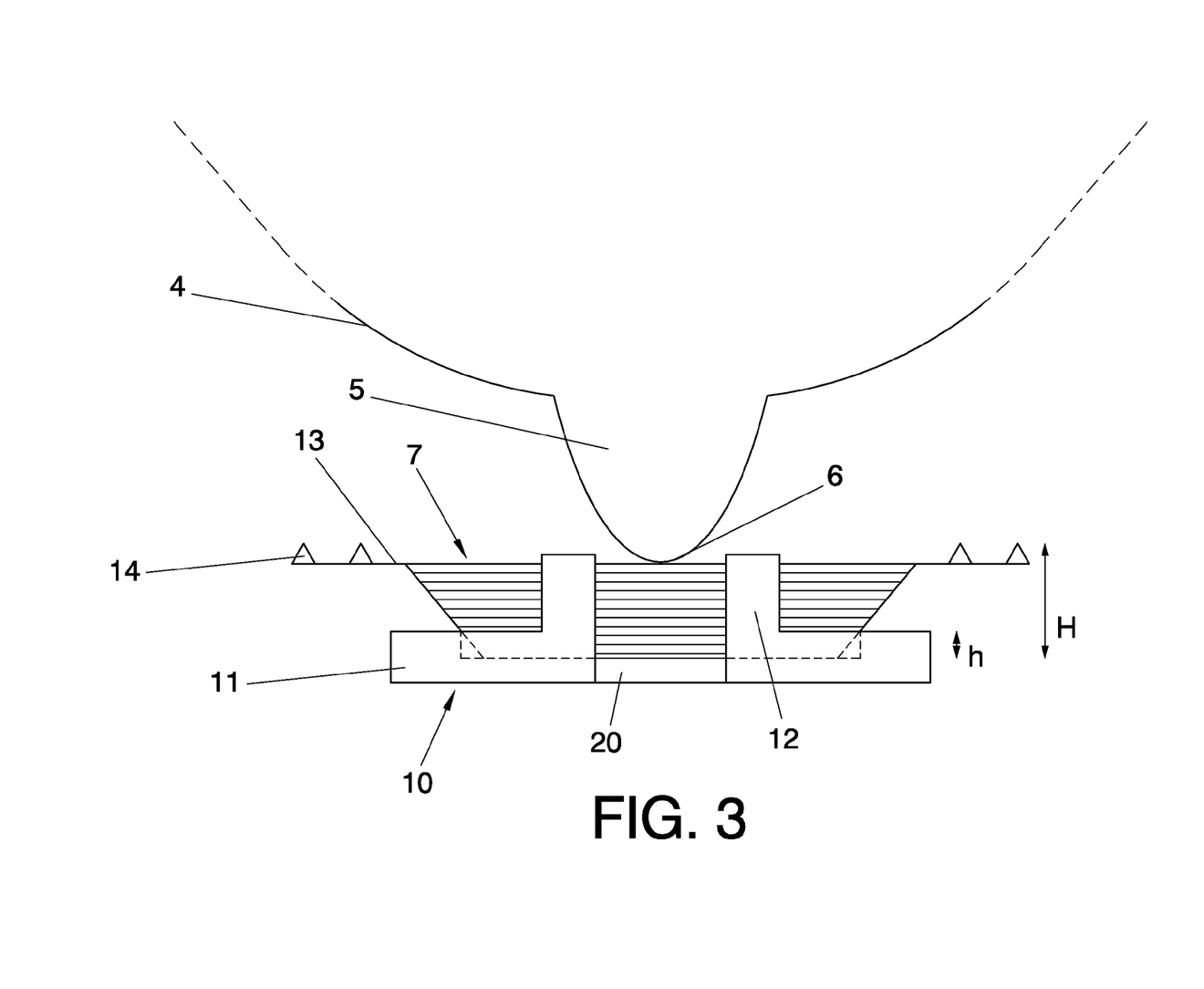
FIG. 3 shows a cross section view of a first embodiment of the invention.

As shown in FIG. 2 and FIG. 4, in this preferred embodiment the AFM probe 7 lies horizontally in the probe receptacle 10, with the tips facing up as shown in FIG. 3. This probe receptacle 10 stems from the bottom wall 21 of the base 8. It comprises a central portion 20 with an upper flat surface that is parallel to the bottom wall 21. This surface 20 is slightly lifted from the bottom wall 21 where aggregates can sediment, therefore even when the container 30 sits in an upright position with the tips facing up, these are not surrounded by contaminants. Importantly, the middle of the central portion 20 is substantially aligned with the protrusion 5 of the lid 1 when this is in a first closed position, thereby ensuring that all the cantilevers 13 and tips 14 on both sides of the chip never touch the protrusion (FIG. 3). This is achieved by appropriately dimensioning the probe receptacle, as described further below.

The portion of the probe receptacle 10 surrounding the central portion 20 of the probe receptacle 10 is shaped in such a way to ensure easy grabbing of the chip by tweezers As shown in FIG. 2, in this preferred embodiment the probe receptacle is delimited by two sets of four pillars 11 and 12, where the space between the pillars 12 allows direct access of a pair of tweezers to the middle of the chip. These pillars 12, have height H higher than the thickness t of the AFM probe 7, and are in contact with the longer sides of the probe 7, which have no protruding cantilevers 13. The pillars 11 have height h, lower than the thickness t of the AFM probe 7, and are in contact with the sides of the probe 7 which support the cantilevers 13 and the tips 14. Therefore, the pillars 11 and 12 substantially limit any (xy) translation and (z) rotation of the AFM probe over the substantially flat central portion 20 of the probe receptacle 10.

The contact area 6 between the probe 7 and the protrusion 5 is punctual, minimizing adhesion and friction between the lid 1 and the probe 7 (FIG. 3). On the other hand, the material of the lid 1 ensures that the probe 7 is not broken, as the relative low Young modulus of the container 30 allows it to accommodate the main part of the deformation when it is in a closed first position.

The probe receptacle 10 is sized to allow the storage and transportation of chips with several standard sizes, and to ensure that the cantilevers 13 never touch any surface of the probe receptacle. The chip dimensions are 1.6 mm×3.4 mm×t, where the thickness t of the chip ranges from 0.3 mm to 0.5 mm in probes from different brands (such as Budgetsensors, Veeco, MikroMash, Olympus). Although the thickness t varies between 0.3 and 0.5 mm, the elasticity of the material and the design of the lid 1 allow the transportation and storage of commercial AFM probes of any thickness.

When the lid 1 is inserted in the base 8, which is filled with liquid 22, the shape of the second portion 4 of the inner surface of the lid 1 ensures that air bubbles are allowed to escape from the liquid during closing, so that no air bubble stays in the container 30. In one embodiment the second portion 4 of the inner surface is convex while in other it may be a substantially conical or spherical shape. This feature avoids air trapping in the liquid, which is undesirable because air bubbles can dry or denaturate sensitive biomolecules (such as proteins) by passing over a functionalised surface. When the container 30 is closed, the cylindrical inner surface 3 of the lid close-fits with the inner surface 9 of the base 8, thus ensuring liquid tightness.

Finally, a carrier for storage and transportation can contain several containers 30, and a correspondent number of liquid-tight lids 1 which hold the probes 7 in their bases 8. In a carrier, each probe is stored individually in order to avoid any possibility of cross-contamination and to ensure the cleanliness of every new probe. Therefore, the probes are held in place and protected, even if the carrier is tilted, jarred, or turned upside-down, yet they can still be easily removed with a pair of tweezers upon removal of the lids. Moreover, if the carrier is stored upside-down, sedimentation of impurities is avoided over the functional side of the tips 14, which will also be face-down.

As those skilled in the art will appreciate, other various modifications, extensions, and changes to the foregoing disclosed embodiments of the present invention are contemplated to be within the scope and spirit of the invention as defined in the following claims.

The invention claimed is:

1. A liquid-tight container, comprising:
   a lid that comprises a flexible material comprising a first portion with at least one protrusion; and
   a base comprising a probe receptacle,
   wherein the probe receptacle comprises a substantially flat portion lifted from an inner bottom wall of the base and at least one first retaining portion surrounding the substantially flat portion of the probe receptacle;
   wherein the lid and the base fit and adjust with each other when the lid is inserted in the base and the protrusion of the lid is aligned with the substantially flat portion of the probe receptacle thereby pressing an AFM probe between the substantially flat portion and the protrusion of the lid, and
   wherein the inner part of the lid comprises a second portion having a convex or substantially conical surface thereby allowing air to progressively escape from the liquid-tight container when closed.

2. The liquid-tight container of claim 1, wherein at least an inner surface of the base, the lid and the probe receptacle comprise a chemically inert material.

3. The liquid-tight container of claim 1, wherein the protrusion of the lid is designed to make punctual contact with a surface.

4. The liquid-tight container of claim 3, wherein the protrusion of the lid has a contact area below 1 mm$^2$ with the AFM probe when the lid is inserted in the base.

5. The liquid-tight container of claim 1, wherein a first height of a second retaining portion of the probe receptacle surrounding the substantially flat portion in contact with a side of the AFM probe without a cantilever is higher than a thickness of a chip comprised in the AFM probe and a second height of the at least one first retaining portion in contact with a side of the AFM probe with a cantilever is substantially lower than the thickness of the chip comprised in the AFM probe.

6. The liquid-tight container of claim 1, wherein the at least one first and second retaining portions of the probe receptacle surrounding the substantially flat portion are pillars.

7. The liquid-tight container of claim 1, wherein the at least one first and second retaining portions of the probe receptacle surrounding the substantially flat portion are two sets of four pillars.

8. The liquid-tight container of claim 1, wherein the second retaining portions of the probe receptacle surrounding the substantially flat portion are discontinuous and leave the chip exposed.

9. The liquid-tight container of claim 1, wherein the second portion of the inner surface of the lid has a substantially convex shape.

10. The liquid-tight container of claim 1, wherein the second portion of the inner surface of the lid has a substantially conical or spherical shape.

11. The liquid-tight container of claim 1, wherein the base and the lid have a cylindrical shape.

12. The liquid-tight container of claim 1, wherein the liquid-tight container is fabricated from a low-adhesion, low-friction and low-outgassing material.

13. A method for storing and transporting AFM probes the method comprising the:

a) filling the base of the liquid-tight container of claim 1 with a liquid;
b) contacting the AFM probe, horizontally and with a tip facing up, with the probe receptacle of the liquid-tight container;
c) fastening the AFM probe with the lid of the liquid-tight container by applying pressure, thereby making a liquid-tight seal; and
d) titling the liquid-tight container upside down, thereby storing the AFM probe in a face-down position.

14. A carrier, comprising;
at least the liquid-tight container of the claim 1.

* * * * *

UNITED STATES PATENT AND TRADEMARK OFFICE
CERTIFICATE OF CORRECTION

| | |
|---|---|
| PATENT NO. | : 8,579,110 B2 |
| APPLICATION NO. | : 13/262482 |
| DATED | : November 12, 2013 |
| INVENTOR(S) | : Elena Martines et al. |

It is certified that error appears in the above-identified patent and that said Letters Patent is hereby corrected as shown below:

On the title page, Item (73), the Assignee's Information is incorrect. Item (73) should read:

--(73)   Assignee: Centro de Investigacion Cooperativa en Biomateriales (CIC Biomagune), San Sebastian (ES)--

Signed and Sealed this
Fourteenth Day of January, 2014

Michelle K. Lee
*Deputy Director of the United States Patent and Trademark Office*